United States Patent [19]
Wegman et al.

[11] Patent Number: 5,909,829
[45] Date of Patent: Jun. 8, 1999

[54] VIBRATORY FILLER FOR POWDERS

[75] Inventors: Paul M. Wegman, Pittsford; Mikhail Vaynshteyn, Rochester, both of N.Y.; Oleg Y. Abramov, St. Petersburg, Russian Federation; Sergei D. Ryabov, St. Petersburg, Russian Federation; Yuri A. Yudin, St. Petersburg, Russian Federation; Alexander G. Kashkarov, St. Petersburg, Russian Federation; Alexander N. Gerasimov, St. Petersburg, Russian Federation; Victor A. Kouzmitchev, St. Petersburg, Russian Federation

[73] Assignee: Xerox Corporation, Stamford, Conn.

[21] Appl. No.: 08/823,034

[22] Filed: Apr. 1, 1997

[51] Int. Cl.[6] .................................................. G01F 11/00
[52] U.S. Cl. ............................................ 222/232; 222/241
[58] Field of Search ................................. 222/231, 232, 222/240, 241, 200

[56] References Cited

U.S. PATENT DOCUMENTS

| | | | |
|---|---|---|---|
| 2,822,934 | 2/1958 | Bartelt | 222/240 |
| 3,251,512 | 5/1966 | Irving | 222/232 |
| 4,561,759 | 12/1985 | Knott | 355/3 DD |
| 4,589,234 | 5/1986 | Rebhan et al. | 222/241 |
| 4,650,312 | 3/1987 | Vineski | 355/15 |
| 4,932,355 | 6/1990 | Neufeld | 118/652 |
| 4,977,428 | 12/1990 | Sakakura et al. | 355/245 |
| 5,095,338 | 3/1992 | Hayes, Jr. et al. | 355/246 |
| 5,337,794 | 8/1994 | Nishiyama et al. | 141/144 |
| 5,339,998 | 8/1994 | Warren | 222/241 |
| 5,438,396 | 8/1995 | Mawdesley | 355/260 |

FOREIGN PATENT DOCUMENTS 2840029  11/1979  Germany ............................. 222/241

Primary Examiner—Philippe Derakshani
Attorney, Agent, or Firm—John S. Wagley

[57] ABSTRACT

A method for filling a powder container is provided. The method includes the steps of placing a first powder container to be filled in filling relationship to a supply of powder in a vessel, mechanically exciting the powder in the vessel to improve its flow properties, dispensing powder from the vessel into the first container, removing the first container from the vessel, and placing a second container to be filled in filling relationship to the vessel.

12 Claims, 7 Drawing Sheets

VIBRATORY FILLER FOR POWDERS

This invention relates generally to filling a container with material, and more particularly concerns an vibratory powder filler for moving powders such as toner from a supply hopper through a fill tube to a container.

Cross reference is made to the following application filed concurrently herewith: Attorney Docket Number D/97058 entitled "Oscillating Valve for Powders" by Paul M. Wegman et al.

Currently when filling powders, for example toners into toner containers, toner is transported from the toner supply hopper into the container by a rotating auger. The auger is a spiral shaped mechanical part which pushes particles of toner inside a fill tube by direct mechanical contact. The nature of this mechanical contact process creates substantial limitations on accuracy and productivity of the toner filling operation. The speed of the toner movement in the fill tube is proportional to the speed of rotation of the auger and is limited by heat release due to auger/toner friction. High auger speed will cause the toner to melt, particularly for low melt toner such as disclosed in U.S. Pat. No. 5,227,460 to Mahabadi et al. the relevant portions thereof incorporated herein by reference.

Toner containers typically have a small opening into which the toner is to be added. Furthermore, the toner containers often have irregular shapes to conform to the allotted space within the copying machine. Therefore it becomes difficult to fill the toner container because of the small tube required to fit into the small toner container opening and secondly for all the toner within the container to completely fill the remote portions of the container before the container overflows.

The problems associated with controlling the filling of toner containers are due primarily to the properties of the toner. Toner is the image-forming material in a developer which when deposited by the field of an electrostatic charge becomes the visible record. There are two different types of developing systems known as one component and two component systems.

In one-component developing systems, the developer material is toner made of particles of magnetic material, usually iron, embedded in a black plastic resin. The iron enables the toner to be magnetically charged. In two-component systems, the developer material is comprised of toner which consists of small polymer or resin particles and a color agent, and carrier which consists of roughly spherical particles or beads usually made of steel. An electrostatic charge between the toner and the carrier bead causes the toner to cling to the carrier in the development process. Control of the flow of these small, abrasive and easily charged particles is very difficult.

The one component and two component systems utilize toner that is very difficult to flow. This is particularly true of the toner used in two component systems, but also for toner for single-component systems. The toner tends to cake and bridge within the hopper. This limits the flow of toner through the small tubes which are required for addition of the toner through the opening of the toner container. Also, this tendency to cake and bridge may cause air gaps to form in the container resulting in partial filling of the container.

Attempts to improve the flow of toner have also included the use of an external vibrating device to loosen the toner within the hopper. These vibrators are energy intensive, costly and not entirely effective and consistent. Furthermore, they tend to cause the toner to cloud causing dirt to accumulate around the filling operation.

The following disclosures may be relevant to various aspects of the present invention:

U.S. Pat. No. 5,337,794

Patentee: Nishiyama et al.

Issue Date: Aug. 16, 1994

U.S. Pat. No. 5,438,396

Patentee: Mawdesley

Issue Date: Aug. 1, 1995

U.S. Pat. No. 5,095,338

Patentee: Hayes, Jr. et al.

Issue Date: Mar. 10, 1992

U.S. Pat. No. 4,977,428

Patentee: Sakakura et al.

Issue Date: Dec. 11, 1990

U.S. Pat. No. 4,932,355

Patentee: Neufeld

Issue Date: Jun. 12, 1990

U.S. Pat. No. 4,650,312

Patentee: Vineski

Issue Date: Mar. 17, 1987

U.S. Pat. No. 4,561,759

Patentee: Knott

Issue Date: Dec. 31, 1985

U.S. patent application Ser. No. 08/540,993

Applicant: Wegman et al

Filing Date: Oct. 12, 1995

U.S. patent application Ser. No. 08/690,412

Applicant: Wegman et al

Filing Date: Jul. 22, 1996

The relevant portions of the foregoing disclosures may be briefly summarized as follows:

U.S. Pat. No. 5,337,794 describes a powder filling apparatus and a method for filling a container with powder. The toner container is filled by conveying toner from a supply hopper through a nozzle with a valve on the end. The valve is disposed at the bottom opening of the nozzle to release and close the opening of the nozzle by the vertical movement of the valve element.

U.S. Pat. No. 5,438,396 is drawn to a toner anti-dribble device which is attached to a toner container having a vertical fill tube and a rotatable auger for feeding toner into a toner container. The toner anti-dribble device also has a sleeve member engagable with the fill tube. A plurality of flexible insertion wires are inserted through the sleeve member into the toner container and disposed substantially perpendicular to the insertion direction of the toner. The arrangement of the wires positively prevents toner dribble between fills while being flexible enough to flex in proportion to the fill rate, which prevents fusing of the toner on the wires.

U.S. Pat. No. 5,095,338 teaches a developer which discharges used carrier particles using a magnetic valve. Discharge of developer material from the developer housing is controlled by a permanent magnet and an electromagnet positioned adjacent an exit port in the developer housing. The permanent magnet generates a magnetic flux field in the region of the exit port to form a developer material curtain which prevents the passage of developer material from the exit port. When the electromagnet is energized, it generates a magnetic flux field which attracts developer material from the developer material curtain. Upon de-energization of the electromagnet, the developer material attracted to it is discharged.

U.S. Pat. No. 4,977,428 discloses an electrographic printer having a pulse motor for driving an agitator. The agitator is built into the developer unit. The agitator is controlled during the initialization process of the apparatus by setting the rotational speed of the motor at a lower level upon startup of the motor. The lower speed results in higher torque to overcome solidification of the toner.

U.S. Pat. No. 4,932,355 discloses a method for removing a developer mix from a developing station with a magnetic closing device which is in the vicinity of a discharge opening in the developing station. In its energized condition, the magnetic closing device creates a magnetic field which acts on the developer mix to form a plug of developer mix in the region of the discharge opening. In the de-energized condition, the magnetic closing device releases the plug of developer mix.

U.S. Pat. No. 4,650,312 discloses a structure for minimizing bridging or packing of toner in the flights of an auger of a toner removal and collection system. The toner antibridging structure includes a pendulum which is caused to periodically bang in to the auger to create vibrations in the auger structure.

U.S. Pat. No. 4,561,759 discloses a device for filling and filtering toner from a supply container. A filter basket is disposed in the region of the filling opening which is closed from the feed container by a filter mesh and an electric vibrator connected thereto by a linkage which can be automatically triggered at the beginning of a filling operation.

U.S. patent application Ser. No. 08/540,993 filed Oct. 12, 1995, entitled "Electromagnetic Valve and Demagnetizing Circuit", Wegman et al., which is assigned to the same assignee as the present application, teaches a method and apparatus for filling a container with a magnetic material using an electromagnetic valve and a demagnetizing circuit to control the flow and properties of the material. In the filling process an auger located inside of the fill tube rotates and moves the material through the fill tube. When the container is filled, the auger stops rotating and the electromagnetic valve is actuated. The electromagnetic valve supplies a magnetic field which holds the material in place, plugging the fill tube with the material as the container is removed and a new container is placed to be filled. When the electromagnetic valve is switched off, a demagnetizing circuit is activated. After the material is demagnetized the auger is switched on and the material flows again to fill the container.

U.S. patent application Ser. No. 08/690,412, which is assigned to the same assignee as the present application, teaches a method and apparatus for filling a container with toner using a series of traveling magnetic fields to control the flow of toner from a supply of toner to the container. Initially, an empty container is placed under a fill tube through which the toner will be supplied to the container. In the filling process the traveling magnetic fields, which are supplied by turning on and off a series of solenoids, and gravity cause toner from the toner supply to move through the fill tube. When a solenoid is turned on toner particles are attracted to its magnetic field where a plug of toner is formed. The solenoids are controlled so that a discrete amount of toner is supplied in each on/off cycle of the solenoids. The solenoid on/off cycle is repeated until the container is filled with toner. When the container is filled, the appropriate solenoid is activated so that a plug of toner stops the flow of toner in the fill tube. The filled container is removed from the fill tube and an empty container is put in its place so that the solenoid on/off cycle may begin again.

All of the above references are hereby incorporated by reference.

SUMMARY

In accordance with one aspect of the present invention, there is provided a method for filling a powder container. The method includes the steps of placing a first powder container to be filled in filling relationship to a supply of powder in a vessel, mechanically exciting the powder in the vessel to improve its flow properties, dispensing powder from the vessel into the first container, removing the first container from the vessel, and placing a second container to be filled in filling relationship to the vessel.

Pursuant to another aspect of the present invention, there is provided an apparatus for assisting the flow of powder from a hopper containing a supply of powder. The apparatus includes a first member operably associated with the hopper and configured to be cyclically driven to provide an acceleration to the powder in a upwardly direction so as to increase the volume of the powder by at least 10%.

Pursuant to yet another aspect of the present invention, there is provided an apparatus for assisting the flow of powder from a hopper. The hopper defining an aperture in the lower portion of the hopper. The apparatus includes a body which defines a body longitudinal axis of the body and which is rotatably mounted to the hopper. The apparatus also includes a shaft which defines a shaft longitudinal axis of the shaft and which is rotatably mounted at least partially within the body. The apparatus further includes a flexible coupling extending from one end of the body and secured to the body. The apparatus also includes a member pivotably secured to and extending downwardly from the flexible coupling. The member is operably associated with the flexible coupling and the shaft so as to permit the member to precess about the shaft longitudinal axis.

Pursuant to a further aspect of the present invention, there is provided an apparatus for assisting the flow of powder from a hopper containing a supply of powder. The apparatus includes a shaft, rotatably connected to the hopper and a first member operably associated with the hopper and the shaft so as to permit the first member to precess about the shaft.

DRAWINGS

Other features of the present invention will become apparent as the following description proceeds and upon reference to the drawings, in which.

DETAILED DESCRIPTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
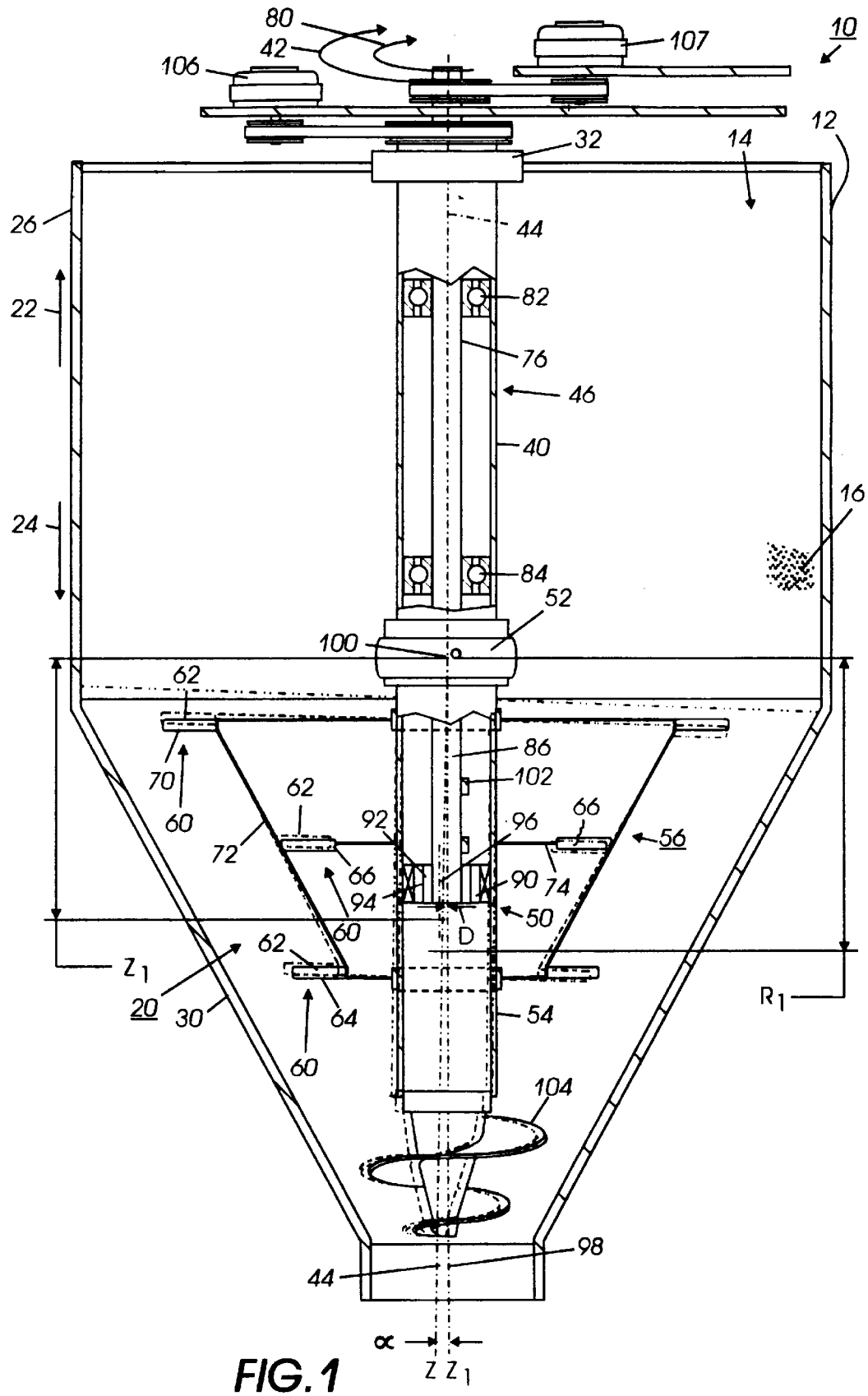
FIG. 1 is a cross-sectional schematic view of a vibratory filler for developer material.

According to the present invention, and referring to FIG. 1, a first embodiment of the vibratory filler 10 for developer material to be discussed is shown. A hopper 12 with a supply of toner 16 is connected to a fill tube 105 (see FIG. 2) which directs toner 16 into a toner container (not shown).

The vibratory filler 10 serves to "liquefy' and control the flow of powders such as xerographic toners. It should be appreciated that the invention is equally well suited for any powder, for example cement, flour, cocoa, herbicides, pesticides, pharmaceuticals, etc. The applicants have found that when the volume of a given mass of toner is caused to be increased by 10 to 15%, the friction between toner particles is reduced by approximately a factor of 40. The additional volume for the particular mass of toner is comprised of air. The air penetration between the particles decreases the friction between the particles. This reduced friction causes the transition of the toner from a powder state to a liquid-like state. In fact, the toner flows as though it was water.

FIG. 1 depicts only one embodiment of a device that is capable of increasing the volume of the toner to improve its flow properties. This increase in volume to cause the dramatic improvement in (by a factor of 40) is known as liquefaction.

The applicants have found that increasing the volume of toner 12 to 15 percent requires that the toner particles be accelerated in a direction opposed to that of the gravitational pull. The toner must thus be accelerated a upwardly direction.

Applicants have found that an acceleration of approximately between one to two times the acceleration of gravity (32 to 64 feet per second squared) is sufficient to permit the liquefaction of toner.

Applicants have also found that subjecting the toner particles to a cyclic or reciprocating force which has a frequency with a range of 20 Hertz to 70 Hertz is effective in creating the liquefaction of the toner. Applicants have found that a Frequency of 50 Hertz to be particularly effective in creating liquefaction.

Applicants have found that when subjecting the toner to a cyclic or reciprocating force, the amplitude of the acceleration is preferably in excess of approximately 1 millimeter.

Referring again to FIG. 1, a vibratory filler 10 is shown. The vibratory filler 10 includes a hopper 12 including a chamber 14 within the hopper 12 for storing a supply of toner 16. The hopper 12 may be made of any suitable, durable material which is chemically non-reactive with the toner 16, for example stainless steel.

An accelerating device 20 is located at least partially within the chamber 14. The accelerating device 20 is utilized to accelerate the toner 16 in a direction of arrow 22 opposed to direction 24 of gravity. It should be appreciated that the accelerating device 20 may be any device capable of accelerating the particles into the direction of arrow 22 with an acceleration of between approximately one or two times the acceleration of gravity (1 to 2 G's) or 32–64 feet per second square The accelerating device 20 as shown in FIG. 1 is mounted to the hopper 12. The hopper 12 may have any suitable shape. For example, as shown in FIG. 1, the hopper may have an upper portion 26 with a generally cylindrical shape and a lower portion 30 with a conical shape.

The accelerating device 20 may be secured to the hopper 12 in any suitable manner. For example, as shown in FIG. 1, the accelerating device 20 maybe secured by upper bearing 32. To provide for rotation of auger 104, the acceleration device 20 includes a housing 40, preferably in the form of a tube. The housing 40 is rotatably mounted by bearing 32 to hopper 12. The housing 40 is preferably rotatable in the direction of arrow 42 about axis 44.

The housing 40 preferably rotates at an angular velocity $\omega_o$. The velocity $\omega_o$ is preferably approximately 5 to 45 revolutions per minute, with 20 revolutions preferred. The housing 40 preferably includes a rigidly mounted upper portion 46 supported by upper bearing 32. The housing 40 also includes a lower portion 50. The lower portion 50 is mounted to the housing upper portion 46 by a flexible coupling 52. The coupling 52 may be any suitable, durable, commercially available coupling. The lower portion 50 rotates at the same rotational velocity ($\omega_o$ as the upper portion 46. However, the lower portion 50 is permitted by the flexible coupling 52 to pivot about centerpoint O of the coupling 52. In the theory of gyroscopes the motion is called regular precession.

The housing 40 may have any suitable shape and can be made of any suitable, durable material which is non-reactive with the toner 16. For example, the housing 40 may be made from stainless steel. The upper portion 46 and the lower portion 50 of the housing 40 is preferably in the form of a hollow tube. The tube has a sufficient diameter and wall thickness to provide ample strength for this application.

To provide a surface for the upward acceleration of the toner 16 in the direction of arrow 22, the vibratory filler 10 includes an agitator 56 extending outwardly from periphery 54 of the lower portion 50 of the housing 40. The agitator 56 may have any suitable shape and be made of any suitable, durable material that is chemically non-reactive with the toner 16. For example, the agitator 56 may be made of stainless steel.

The agitator 56 preferably includes a feature 60 preferably in the form of rings to provide a surface 62 for the upward acceleration of the toner 16.

The rings 60 may extend directly from the periphery 54 of lower portion 50, but preferably, to enhance their effectiveness, the rings 60 are positioned a distance from the periphery 54. It should be appreciated that a single ring 60 may be sufficient for the invention, preferably, however, a plurality of rings are included with agitator 56. The rings 60, as shown in FIG. 1, include a lower ring 64, a central ring 66 and an upper ring 70. The rings 60 are interconnected in any suitable fashion. For example braces 72 interconnect the lower ring 64, Central ring 66, and the upper ring 70. The rings 60 are spaced from the periphery 54 by spokes 74 extending outwardly from periphery 54 to the rings 60.

The agitator 56 is secured to housing 40 in any suitable fashion, for example by an interference fit or by welding to the lower portion 50. The agitator 56 thus rotates in the direction of arrow 42 at a rotational speed $\omega_o$ with upper portion 46 of housing 40.

A shaft 76 is located within housing 40. The shaft 76 rotates in a direction of arrow 80 at a rotational speed $W_s$ of approximately 3,000 revolutions per minute. The shaft 76 rotates about axis 44 of housing 40 and is concentric with upper portion 46 of housing 40. The shaft 76 generally extends the length of upper portion 46, through flexible coupling 52 and through lower portion 50 of the housing 40. The shaft 76 is supported within upper portion 46 of housing 40 by upper bearing 82 and lower bearing 84. The bearings 82 and 84 maybe any suitable bearings, for example commercially available ball bearings. The shaft 76 includes a lower portion 86 which extends within the lower portion 50 of housing 40 with the lower portion 86 rotating about axis 44.

The lower portion 50 of housing 40 is supported at its upper end by the flexible coupling 52. The lower portion 50 is also supported at a position below coupling 52 by shaft 76. A bearing 90 is used to support the lower portion 50 below coupling 52. The bearing 90 is preferably a commercially available double row spherical ball bearing.

An eccentric bushing 92 is secured to lower portion 86 of shaft 76 at bearing 90. The eccentric bushing has a cylindrical bore which may be fitted to shaft 76 and an outer periphery 94 with a centerpoint 96 which is spaced from axis 44 a distance D. The outer periphery 94 of bushing 92 is fitted to bearing 90. Bearing 90 is secured to lower portion 50 of housing 40 and to shaft 76 any suitable fashion, but preferably by an interference fit.

The lower portion 50 of housing 40 and the agitator 56 thus rotate about centerline axis 98. The centerline axis 98 is defined by centerpoint 100 of the flexible coupling 52 and by centerpoint 96 of bushing 92.

The axis 98 of the agitator 56 assumes the motion similar to the motion of the axis of a freely spinning top or follows or traces the surface of the cone defined by center axis 44 and axis 98 which nutates about around center axis 44. The agitator 56 thus accomplishes a complicated motion which in gyroscope theory is called "regular precession". The agitator slowly rotates about axis 98 with an angular velocity ($\omega_o$ of 5 to 45 RPM. The axis 98 processes or nutates around axis 44 of shaft with an angular velocity $\omega_s$ of approximately 3000 RPM. The rotation of the shaft at 3,000 RPM is identical to a rotation of 50 revolution per second. Thus the shaft causes the agitator 56 to oscillate at 50 cycles per second or 50 Hertz.

The amplitude of the oscillation in the vertical direction of the agitator 56 and the lower portion 50 of the housing 40 at any point in the mechanism may be defined by Formula:

$$A_i = R_i \tan \alpha$$

where:

$A_i$ is the amplitude of the oscillation at any point in the mechanism in the vertical direction $R_i$ is the length of the perpendicular from that point in the mechanism to the axis 44

$\alpha$ is the angle between axis 98 and axis 44

Further, the acceleration of the oscillations may be defined by the formula:

$$Am = A_i \omega_s^2 \tan \alpha$$

where:

Am is the acceleration of the oscillations in the vertical direction;

$A_i$ is the amplitude of the oscillations in the vertical direction;

$\omega_s$ is the angular rotation speed of the shaft 76 of the vibrator

The vertical oscillations of the upper surface 62 of the rings 60 creates upward acceleration of the toner 16, creating the toner liquefaction. The liquefied area expands outwardly from the rings 60 over time causing all the toner 16 within the entire hopper 12 to become liquefied.

To reduce the vibration level of the shaft, the shaft is preferably dynamically balanced by balance weights 102 positioned on the shaft opposed to the eccentric bushing. The mass and position of the weights 102 is chosen to balance the shaft to an acceptable level.

To regulate the flow of toner toward fill tube 105 (see FIG. 2) position at lower end of lower portion 30 of hopper 12, an auger 104 is preferably attached to the lower end of lower portion 50 of housing 40 and rotates therewith. The auger may have any suitable shape and be made of any suitable, durable material that is non-reactive with the toner 16. For example, the auger 104 may be made of stainless steel. The auger may have a conical shape as shown and be positioned above fill tube 105.

The housing 40 may be rotated in any suitable manner, for example by a housing electric motor 106. The shaft 76 is likewise rotated by any suitable manner, for example by a shaft electrical motor 107. It should be appreciated that the motors 106 and 107 may be replace by a common motor and a transmission.

To regulate the flow of toner from the hopper 12, a valve 108 (see FIG. 2) is preferably positioned within fill tube 105. The valve 108 may be any suitable, durable valve capable of regulating the flow of toner. Any mechanical valve of proper size and shape to handle the flow rate when open may be used, for example a mechanical gate valve. One particular valve 108 which is effective in regulating toner and, in particular in selectively opening and closing the flow of magnetic toner is an electromechanical toner valve which is disclosed in U.S. patent application Ser. No. 08/540,993, the relevant portions thereof incorporated herein by reference.

Figure 2:
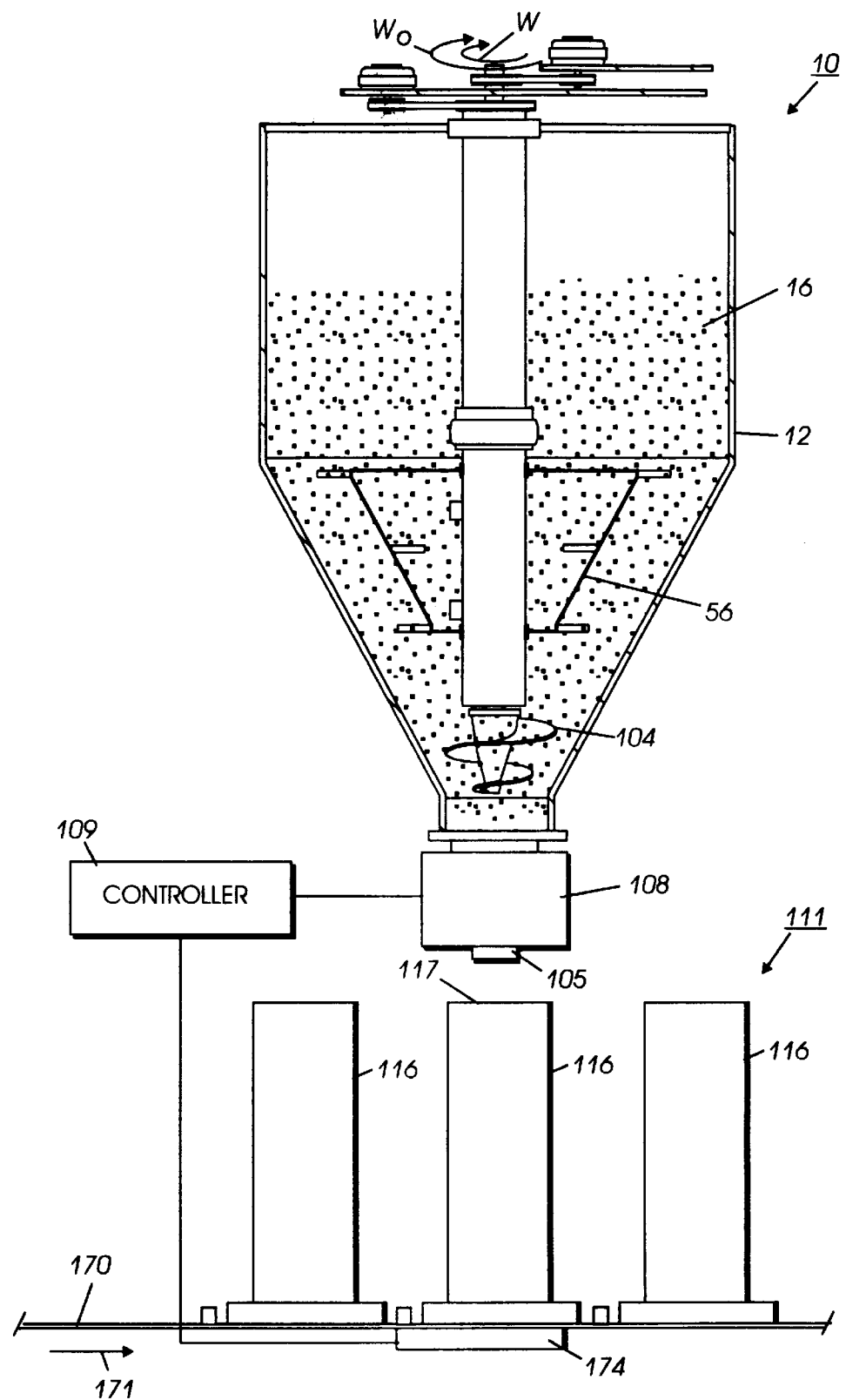
FIG. 2 is a side view of a container filling system for use with the vibratory filler for developer material of FIG. 1 after the container is filled.

Referring now to FIG. 2, the vibratory filler 10 is shown installed in the hopper 12 and positioned over an automatic high speed production filling line 111. A conveyor 170 advances a container 116 to be filled in the direction of arrow 171 to a position with the toner opening 117 of the container 116 directly below fill tube 105. A lifting mechanism 174 raises the container 116 into engagement with the fill tube 105. The agitator 56 advances toner 16 toward auger 104. When a container 116 is to be filled, a controller 109 signals the valve 108 to be energized. The valve 108 permits the toner to pass to fill tube 105. The toner 16 advances into container 116 and fills the container. The lifting mechanism 174 then lowers the container 116 and the conveyor 170 advances another container 116 into filling position. It should be appreciated that, alternatively, depending on the size of the container opening, the toner may be dispensed directly from the valve 108 into the container opening. The direct dispensing of the toner from the valve into the container would obviate the need for a lifting mechanism and permit more rapid filling. A filling process which has clearance between the valve and the container would require suitable dust control.

Figure 3:
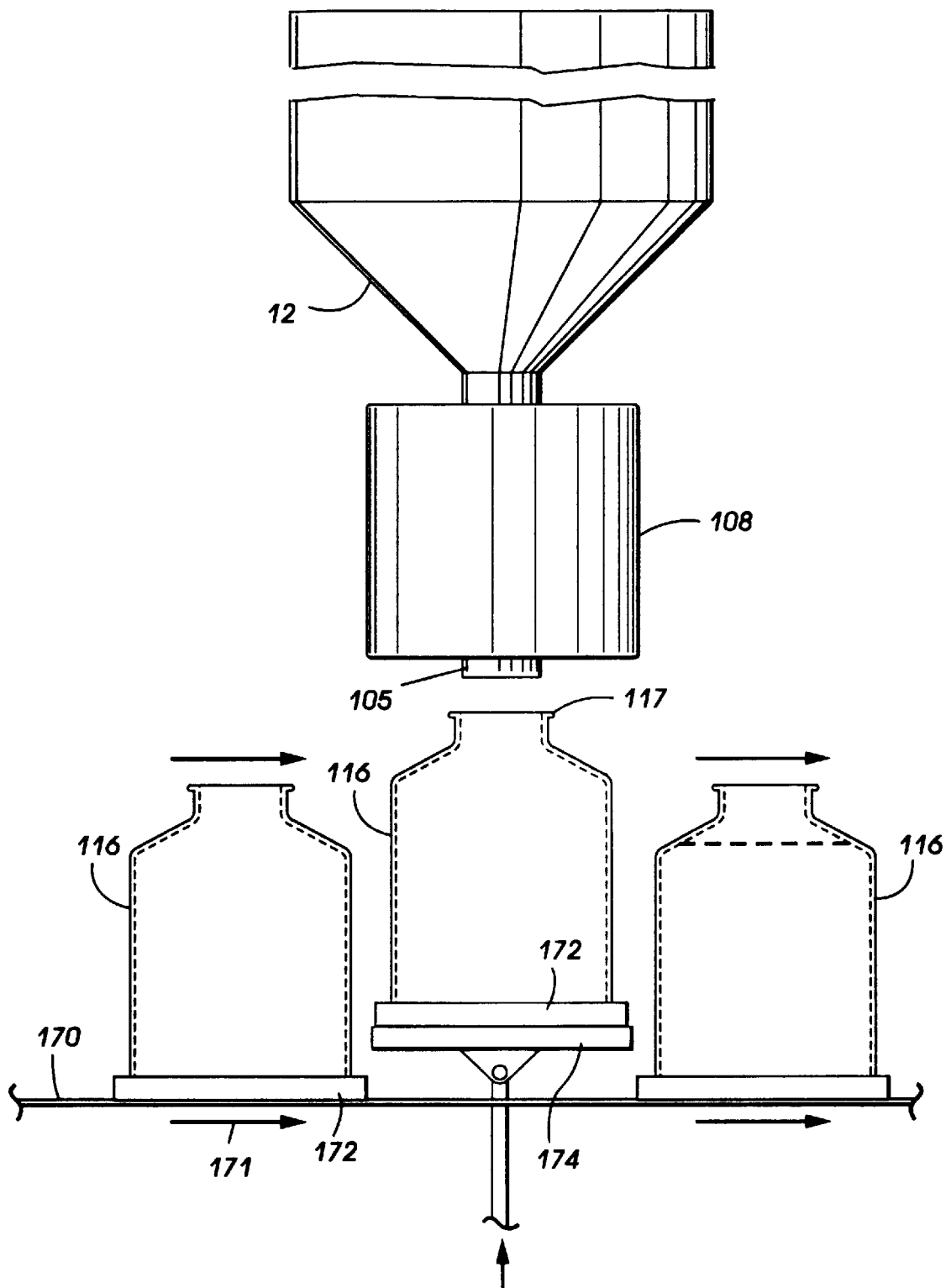
FIG. 3 is a side view of the container filling system for use with the vibratory filler for developer material of FIG. 1 prior to filling the container.

FIG. 3 depicts a side view of moving containers 116 along an indexing conveyor 170 relative to the fill tube 105, which is relevant to all of the embodiments. Each of the containers is positioned in a carrying device 172, also known as a puck. Each puck is specially designed and built for each type of toner container, the puck allowing for different container widths and heights. A puck is used so that the same conveying and lifting system can be used with varying toner container types. When the container is in position under the fill tube the lifting mechanism 174 pushes the puck with the container in it up until the lifting mechanism is fully extended. When the lifting mechanism is fully extended, the container is in the proper filling relationship with the fill tube. It should be appreciated that the container may be placed on a conveyor without a puck, particularly if the filling line is a dedicated line and if the container has a self-supporting shape that would not to permit the container to easily tip.

Figure 4:
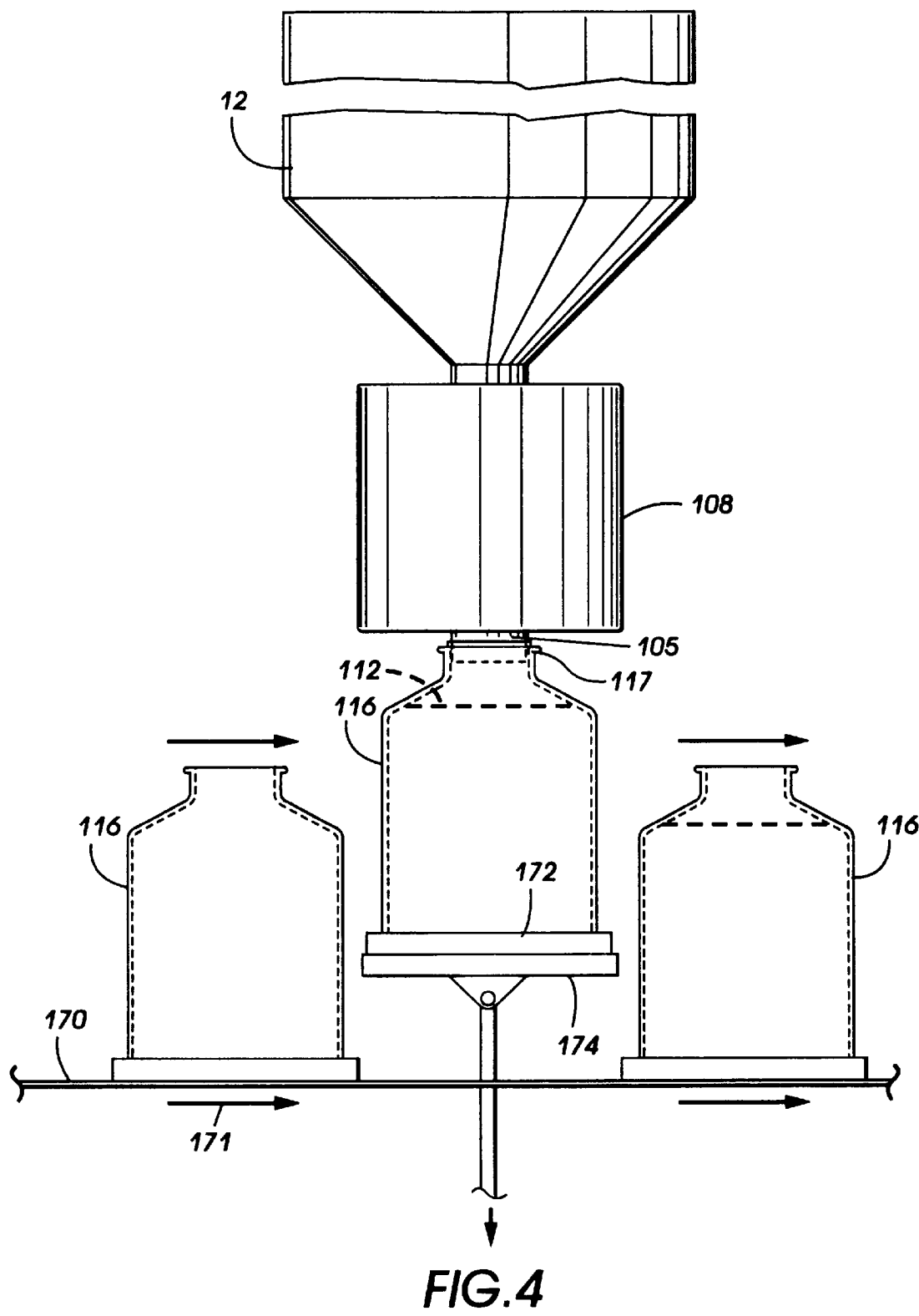
FIG. 4 is a side view of the container filling system of FIG. 2 incorporating the FIG. 1 vibratory filler for developer material.

FIG. 4 shows the container in the proper filling relationship to the fill tube, the container opening 117 receiving the end of the fill tube 105. The amount of toner loaded in the container is predetermined based on the size of the container, the toner flow rate is controlled by the parameters of the acceleration device 20 and the toner is permitted to flow for a sufficient time to fill the container. The flow is stopped by any suitable method such as a mechanical valve, for example a gate valve, or if the toner is magnetic, by an electromagnetic valve as described in U.S. patent application Ser. No. 08/540,993, which is assigned to the same assignee as the present invention, the relevant portions thereof incorporated herein by reference. Once the predetermined amount of toner passes through the fill tube the container is filled and the filling process is begun again so that as the container is moved from the fill tube, the toner is held in place with a toner plug. The fill tube 105 is sized so that it is slightly smaller than the toner container opening 117.

Figure 5:
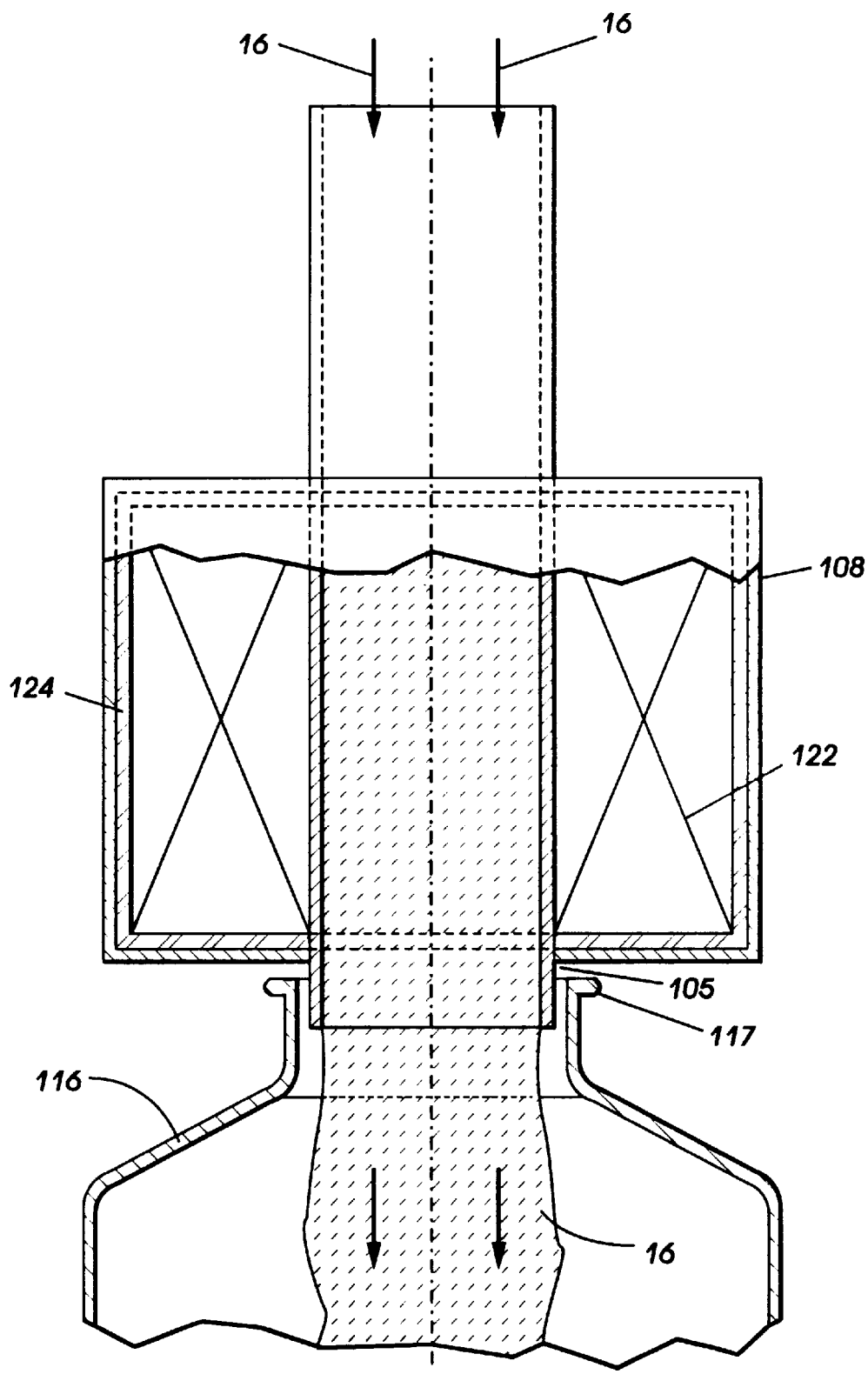
FIG. 5 is a cross-sectional schematic view of an open channel radial magnetic field toner filling valve for use with the container filling system of FIG. 2.

Referring now to FIG. 5, an electromagnetic toner valve 108 as described more fully in U.S. patent application Ser. No. 08/540,993 is shown. Fill tube 105 for feeding toner 16 into a toner container 116 is shown. The fill tube is sized so that it is slightly smaller than the toner container filling opening 117. The electromagnetic toner valve 108 has a solenoid comprised of windings 122 located on the fill tube through which the toner 16. The windings are preferably surrounded by insulation 124 for safety and cleanliness purposes. When the toner valve is under power, the solenoid will generate a magnetic field sufficient to freeze or stop all toner particles inside the tube including those on the auger.

The applicants have discovered that rather than liquefying the entire volume of toner within the toner hopper, liquefaction can occur locally around the fill tube of the toner hopper. By only liquefying toner adjacent the fill tube the amount of energy required to liquefy the toner is greatly reduced. Also, the liquefying of toner adjacent the fill tube can also serve as a method of metering the flow of toner adjacent the fill tube, permitting the liquefying of the toner to serve also a the toner valve. Toner flow when the vibrator is activated and clogs when the vibrator is deactivated.

Figure 6:
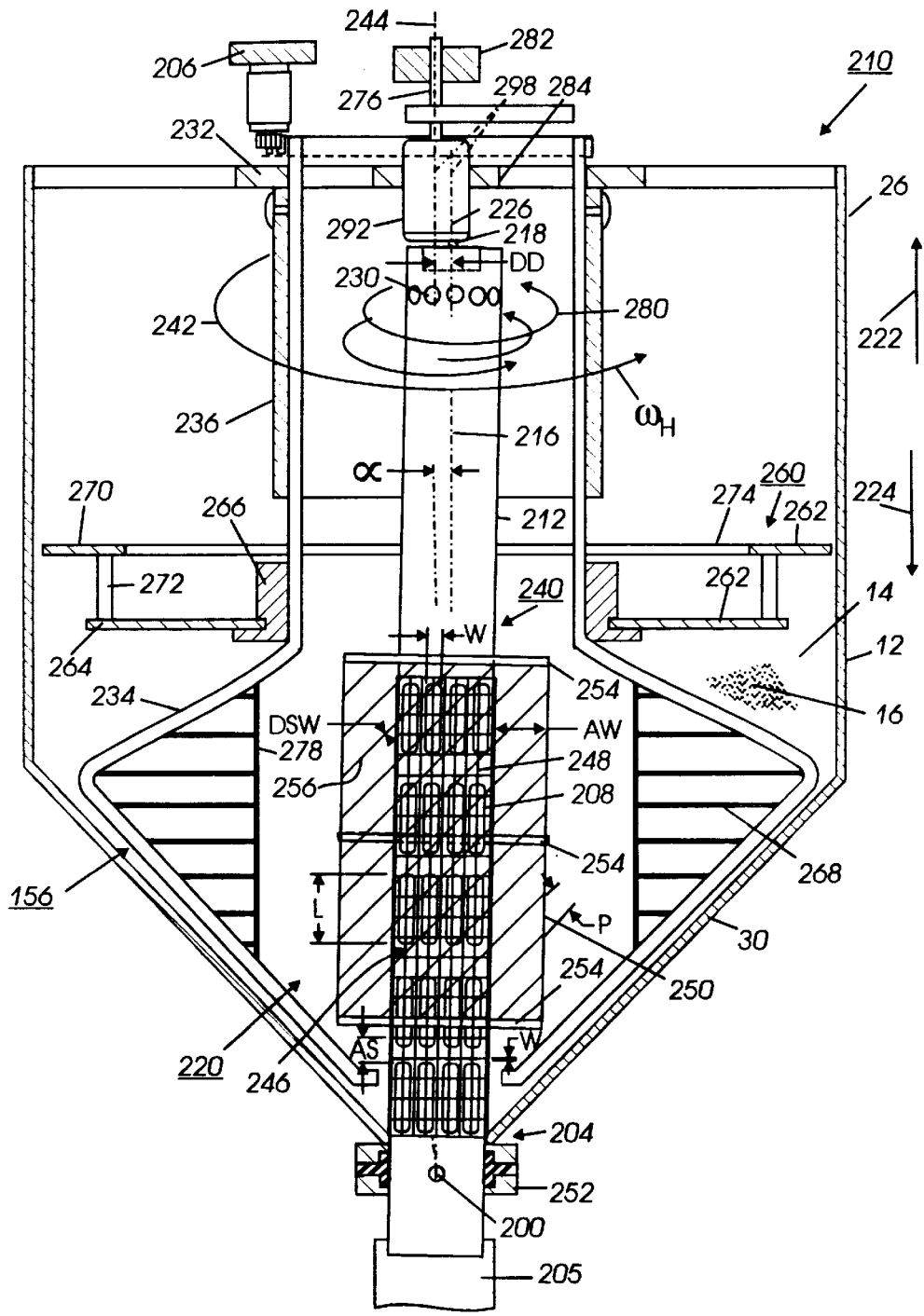
FIG. 6 is a cross-sectional schematic view of an alternate embodiment of the vibratory filler for developer material of the present invention.

An alternate embodiment of a toner liquefaction device according to the present invention is shown in FIG. 6 which also serves as the toner valve.

The toner liquefaction device is shown as an oscillating valve 210 and is positioned at least partially within hopper 12. The hopper 12 includes a chamber 14 for storing a quality of toner 16. The hopper may have upper portion 26 with a generally cylindrical shape and lower portion 30 with a conical shape.

It should be appreciated that the vibratory valve 210 includes any valve which causes a localized liquefaction of toner. The toner is guided to that localized area and is caused to be liquefied by exciting the toner and caused to stop flowing or be clogged by stopping the excitation of the toner.

The vibratory valve 210 includes an acceleration device 220 for accelerating the toner in an upward direction with sufficient acceleration to increase the volume of the toner and thereby cause the toner to be liquefied.

Preferably, as shown in FIG. 6, the acceleration device 220 includes a tube 240. The tube 240 extends downwardly to hopper opening 204 in lower portion 30 of hopper 12. The tube 240 includes at least one aperture 208 in the periphery 212 thereof. While the tube 240 may operate with only a single aperture 208, preferably, the tube 240 includes a plurality of equally spaced apertures 208 through the periphery 212 of the tube 240.

The tube 240 may be supported within the hopper 12 in any suitable fashion for example, as shown in FIG. 6, the tube 240 is supported by eccentric bushing 292 in the upper portion of the hopper 12 and is sealed at flange 252 mounted to hopper 12.

As shown in FIG. 6, preferably, the tube 240 includes apertures 208 in the form of elongated slots extending in a vertical direction parallel to tube axis 216. The slots 208 have a length L and a width W. The dimensions for length L and width W depend on the desired flow, the amplitude of the vibrations of the valve 210 and the type of powder dispensed. As shown in FIG. 6, the apertures are equally spaced around tube 240. The apertures 208 may be located on several rows. As shown in FIG. 6, there are five rows of apertures 208. The tubing 240 is caused to pivot and oscillate about flange 252. This may be accomplished in any suitable fashion.

For example, as shown in FIG. 6, the tube 240 is supported on its upper end by a stem 218. The stem 218 may extend upwardly from the upper end of tube 240.

An eccentric bushing 292 extends downwardly from shaft 276. The bushing is connected to the shaft 276 and rotates therewith about shaft axis 244. Shaft 276 rotates by any suitable manner, for example, by shaft motor (not shown). The shaft 276 is supported by bearings 282 and 284. The shaft rotates in direction of arrow 280 at a rotational speed $\omega_s$ of approximately 3,000 revolutions per minute.

The bushing 292 includes an offset bore 226 having a centerline 298 offset from the shaft centerline 244 a distance DD. The stem 218 is rotatably fitted into the offset bore 226. As the eccentric bushing 292 rotates with the shaft 276 at rotational speed $\omega_s$ of 3,000 RPM the stem 218 orbits about the eccentric bushing centerline 244 at a frequency of 3,000 cycles per minute or 50 cycles per second or 50 Hertz. To minimize vibrations of the acceleration device 220, the shaft 276 and bushing 292 are dynamically balanced.

While the upper end of the tube orbits about centerline 244, the lower end of tube 240 pivots about vertical centerline 200 of flange 252.

The amplitude of the oscillation of the tube 240 at any point in the mechanism in the vertical direction may be defined by Formula:

$$A_i = R_i \tan \alpha$$

where:

A$_i$ is the amplitude of the oscillation in the vertical direction at any point of the mechanism R$_i$ is the horizontal distance from the shaft axis 244 to that point in the mechanism α is the angle between axis 216 and axis 244 with the root at the point O Further, the acceleration of the oscillations in the vertical direction which creates the effect of liquefaction may be defined by the formula:

$$Am = A_i \omega_s^2 \tan \alpha$$

where:

Am is the acceleration of the oscillations in the vertical direction;

A$_i$ is the amplitude of the oscillations in the vertical direction;

$\omega_{si}$ is the angular rotation speed of the shaft 276

With rotation of the eccentric bushing 292, the upper section of the tube 240 performs nutation with the frequency of the shaft 276. The toner adjacent the tube 240 is greatly influenced by the vibration. Influenced by this vibration, the toner 16 near pipe 240 is vibro-liquefied and flows through the apertures 208 in the periphery 212 of the tube 240 into the inside of tube 240. By the force of gravity, the toner freely falls through the interior of the tube 240. The toner may fall directly into a toner cartridge (not shown) or may alternatively enter fill tube 205. From the fill tube 205, the toner 16 is dispensed into the toner cartridge. If the toner is dispensed directly from tube 240 into the toner cartridge, care must be taken to avoid having toner dust contaminate the filling line.

Preferably the tube 240 includes decompression or venting perforations or holes 230 through the periphery 214 of the tube 240 near the upper end of tube 240. The decompression perforations 230 serve to provide air access inside the tube 240 to allow free access of air through the interior of tube 240 to permit the toner 16 to freely fall within the tube 240. To prevent the clogging of the perforations 230 by the toner 16, preferably a protective cap 236 in the form of a sleeve is position around the tube at the perforations 230.

When the shaft motor is stopped, the nutation of the tube 240 stops and the liquefaction of the toner at apertures 208 stops. The toner 16 bridges over the apertures 208 and the flow stops. Dispensing of the toner 16 thus can be controlled simply by starting and stopping the shaft motor.

While the system as described above will provide for the liquefaction of toner and improve flow of toner, the dispensing of the toner may not be closely controlled. Preferably, therefore, additional structure has been discovered by the applicants which will improve the control of the toner flow. For example, as shown in FIG. 6, first grid 246 is used to increase the uniformity of toner flow into the tube 240 at the apertures 208.

The first grid 246 may be made of any suitable durable material which is chemically non-reactive with toner 16 and which assists in regulating the flow of toner. For example, the grid 246 may be made of a series of first grid wires 248. The wires 248 may for example be made of stainless steel. The first grid wires 248 have a wire diameter WR, of perhaps 0.05 inches, preferably, located over periphery 212 of tube 240 at least adjacent the apertures 208. The first grid wires 248 may be placed in any reasonable pattern. As shown in FIG. 6, the wires are spaced circumferentially on the periphery of tube 240. The wires 248 are preferably spaced apart a distance AS from each other, for example 0.5 inches.

The flow rate may be uniformly controlled with the use of first grid 246. Preferably, however, the acceleration device 220 further includes a second grid 250. The second grid 250 may have any suitable configuration capable of improving the flow rate uniformity. For example, as shown in FIG. 6, the second grid 250 includes a series of second grid wires 256 spaced a distance AW from the periphery 212 of the tube 240. The second grid wires 256 are supported by any suitable method around the tube 240. For example, the wires 256 are supported by rings 254 extending outwardly from the periphery 212 and secured thereto. The wires 256 are secured to ring 254 in any suitable manner, but, preferably, as shown in FIG. 6, the wires 256 are uniformly positioned around ring 256 a distance P from each other. The wire 256 are preferably horizontally oriented, but are shown diagonally in FIG. 6 for clarity. The second grid 250 is preferably positioned around the apertures 208 to improve the uniformity of the flow of toner 16 into the apertures and thereby increasing the flow through the apertures.

Since the vibratory valve 210 of FIG. 6 causes the toner 16 to liquefy in localized areas adjacent the apertures 208, the applicants have found that the toner flows rapidly adjacent the apertures 208 and has a tendency to "rat hole" or have cavities spaced from the apertures which rat holes stop the progressing of the vibrations within the acceleration device t220, thus inhibiting the liquefaction process around the apertures 208. Thus the rat holes tend to provide an air gap between the liquefied toner adjacent the apertures and the remaining toner within the hopper 12. An agitator 156 has thus been utilized to advance the toner 16 within hopper 12 toward the apertures 208.

The agitator 156 may have any structure and may be made of any materials suitable for transferring the toner 16 toward apertures 208. For example, the agitator 156 may include an agitator blade 234. To balance the forces within agitator 156, preferably, the agitator 156 includes two opposed blades 234. The blades 234 are supported in any suitable fashion. For example, the blades 234 are connected by circular disk 266. Wire braces 268 and 278 help to mix and move the toner toward the tube 240. The agitator 156 preferably rotates around tube 240. The agitator 156 is supported at its upper end by upper bearing 232. Bearings 232 is mounted to hopper 12. Thus, the agitator 156 rotates about shaft axis 244.

To reduce the impact of hydrostatic pressure on the upper layer of toner, applicants have found that the addition of features in the form of rings are helpful. Preferably, the agitator 156 includes bottom ring 264 extending from disk 266. Bottom ring 264 is fixedly secured to agitator 156 and rotates therewith. Preferably, a top ring 270 is positioned spaced from and above bottom ring 264 and is supported by braces 272 and spokes 274. Top ring 270 also rotates with agitator 156. The agitator 156 is caused to rotate in any suitable fashion, for example, by agitator motor 206. The agitator 156 rotates in the direction of arrow 242 and a rotational speed $\omega_H$ of approximately 3 to 45 revolutions per minute.

Applicants have discovered that the component of the acceleration of the acceleration device 220 in the direction of arrow 222 opposed to the direction of gravity as shown in arrow 224 is responsible for the liquefaction of the toner. A device for accelerating toner is most efficient, therefore, when moving toner substantially in the direction of arrow 222. Thus, a vibratory valve which has an acceleration device which moves in the direction of arrow 222 exclusively would be preferred.

Figure 7:
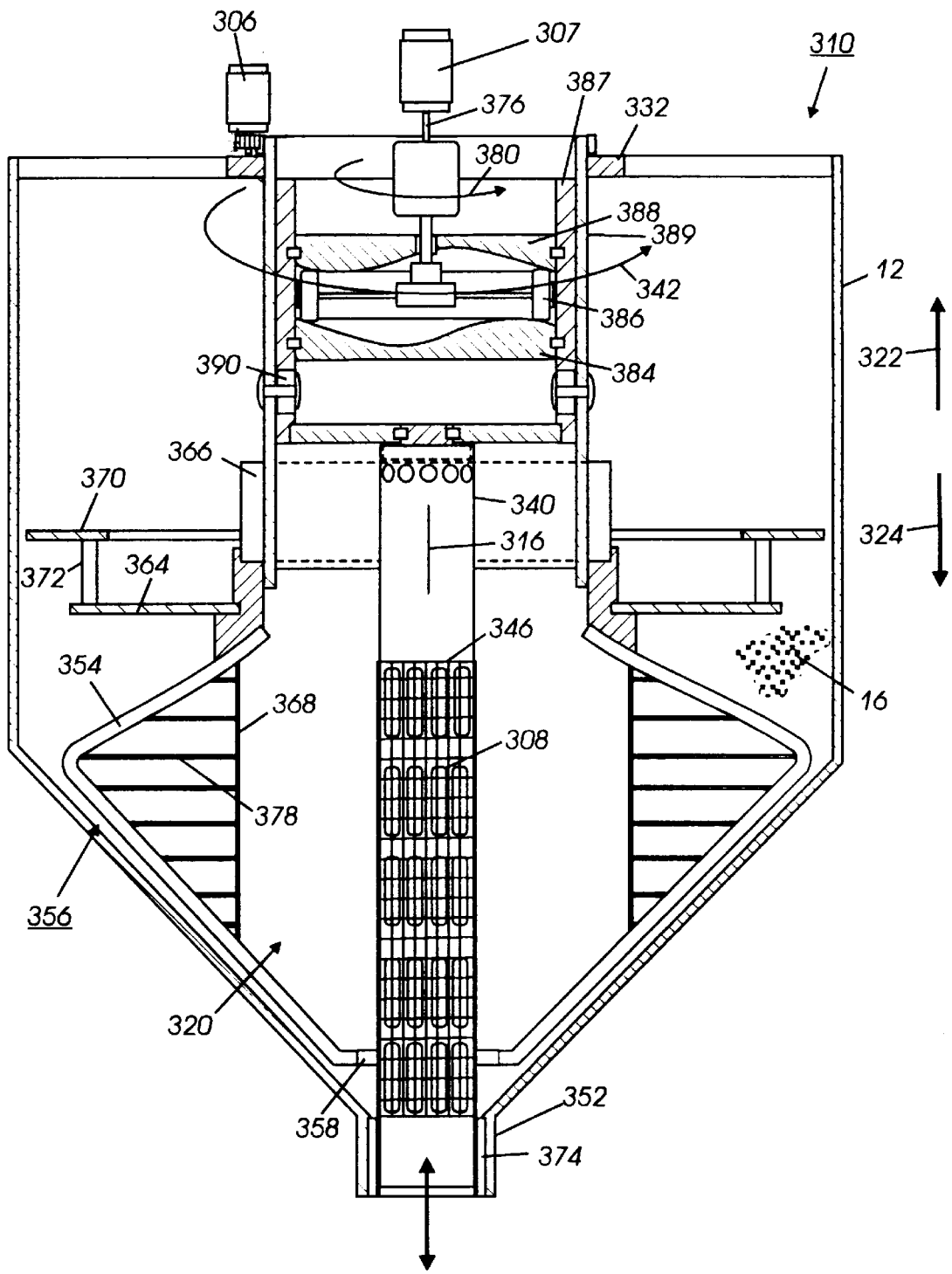
FIG. 7 is a cross-sectional schematic view of another alternate embodiment of the vibratory filler for developer material of the present invention.

Referring now to FIG. 7 vibratory valve 310 is shown. Valve 310 is similar to valve 210 except that tube 340 moves exclusively in the direction of arrows 322 and 324, reciprocating therebetween.

The vibratory valve 310 is similar to valve 210 of FIG. 6. Valve 310 includes an acceleration device 320 which is similar to acceleration device 220 of FIG. 6 except that the tube 340 unlike tube 240 of FIG. 6 moves exclusively in a direction parallel to centerline axis 316. Tube 340 thus moves upwardly in direction of arrow 322 and downwardly in direction of arrow 324.

Any suitable method may be used for oscillating the tube 340. For example as shown in FIG. 7, the tube 340 is rigidly connected to cams 384 and 388. Rollers 386 are positioned between lower cam 384 and upper cam 388 and when rotated force the tube to oscillate. Rollers 386 are rotated by auger shaft 376. The auger shaft 376 may be rotated in the direction of arrow 380 at a rotational speed $\omega_{ss}$ of approximately 4,500 revolutions per minute by any suitable device, for example, by shaft motor 307.

As the auger shaft 376 rotates, the rollers likewise rotate in the horizontal plane and cause the cams 384 and 388 which are fixedly secured to cam support 387 to move upwardly and downwardly. The cams 384 and 388 are fixedly connected to tube 340 by cam support 387. Cam support 387 slides upward and downwardly within agitator shaft 389 within the slots 390. The cams 384 and 388 cause tube 340 to oscillate upward and downwardly in the direction of arrows 322 and 324. The tube 340 protrudes through the hopper 12 at lower bushings 374 which is secured to tube flange 352 and is secured to the cam containing system.

The tube 340 preferably includes apertures 308 located in the tube walls. The apertures 308 are similar to apertures 208 of FIG. 6. Toner is caused to progress through apertures 308 when the tube 340 is caused to oscillate. The toner is caused to clog in the aperture 308 when the auger shaft 376 does not rotate. To assist in controlling the flow of toner, the apertures 308, preferably, a grid 346 similar to grid 246 of FIG. 6 is applied over the tube 340 at least adjacent the apertures 308. While the tube 340 as shown includes only first grid 346, it should be appreciated that the tube 340 may also include a second grid (not shown) spaced from first grid 346, which may be similar to second grid 250 of FIG. 6.

As shown in FIG. 7 the tube is caused to oscillate in the direction of tube axis 316 by an auger shaft and cam mechanism. It should be appreciated that any other mechanism capable of oscillating the tube will be sufficient. For example, the tube 340 may be oscillated by an electromechanical vibrator.

The tube 340 may oscillate at any frequency but, preferably oscillates at a frequency of approximately 10 to 200 Hertz with 69 Hertz being preferred.

The tube 340 oscillates in the direction of tube axis 316 in upward direction 322 and downward direction 324 with a stroke or oscillation distance DH of approximately 0.06 inches. The amplitude of the oscillations effects the acceleration of the particles and the ability of the toner to become liquefied.

The acceleration of the oscillations in the vertical direction which creates the effect of liquefaction may be defined by the formula:

As with the valve 210, the valve 310 preferably includes an agitator 356 similar to agitator 156 of FIG. 6. The agitator 356 serves to move the toner particles toward the apertures 308. The agitator 356 is similar to agitator 156 of FIG. 6.

The agitator 356 preferably includes a pair of agitator blades 354 similar to blades 254 of agitator 156. The agitator blades are secured to the agitator by a fastening ring 358 and by a disk 366. Braces 378 and braces 368 provide additional agitation.

The agitator 356 may be made of any suitable, durable non chemically reactive material, for example, stainless steel. The disk 366 is connected to an agitator shaft 389. The agitator shaft is rotated in the direction of arrow 342 and at angular rotational speed $\omega_{\omega\omega}$ of approximately 5 to 45 revolutions per minute. The agitator 356 is rotatably supported around agitator axis 316 by upper bearing 332. The bearing 332 is secured to hopper 12.

The tube 340 is preferably fixedly secured to cam support 387, while the cam support is slidably secured to agitator shaft 389. The agitator shaft is fixedly secured to agitator and rotates therewith. The tube 340 thus tends to rotate with the agitator 356. It should be appreciated that the valve 310 may be constructed such that the tube 340 does not rotate or rotates at a speed different from that of the agitator 365.

Preferably, to reduce the impact of hydrostatic pressure on the upper layer of the toner, the agitator 356 preferably also includes a feature, for example rings, for reducing hydrostatic pressure. The rings preferably include a bottom ring 364 connecting to disk 366. Extending upwardly from bottom ring 364 is top ring 370. Top ring 370 is connected to bottom ring 364 by braces 372. The rings 364 and 370 rotate with the agitator blades 354 and are connected thereto.

By providing a vibratory toner filling method which subjects the toner to an acceleration which increases the toner volume by at least 10 percent, toner liquefaction which increases toner flow rates by as much as 40 times can occur.

By providing a toner filling method which includes the step of mechanically exciting the toner with a vibration source of from ten to 200 Hertz, the toner may become liquefied, greatly increasing its flow properties.

By providing a toner filling method which includes the step of mechanically exciting the toner with an upward acceleration of at least 32 feet per second squared, the toner may become liquefied, greatly increasing its flow properties.

By providing an apparatus for assisting the flow of toner from a hopper with the apparatus having a member connected to a body with the member orbiting about the body to provide a vertical acceleration force to the toner, toner liquefaction and resulting increased flow can occur.

By providing an apparatus with a orbiting second member rotating with a flexible coupling around a first member, a vertical acceleration may be imparted to the toner to cause toner liquefaction and thus improved toner flow In recapitulation, a vibratory filler for developer material has been described as a improved method for liquefying toner flow for filling toner containers. This method allows toner to be moved more accurately and rapidly than prior art systems and also insures that the toner container is filled completely and cleanly.

It is, therefore, apparent that there has been provided in accordance with the present invention, an vibratory toner filler that fully satisfies the aims and advantages hereinbefore set forth. While this invention has been described in conjunction with specific embodiments, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for assisting the flow of powder from a hopper, comprising:

a first member operably associated with the hopper and configured to be cyclically driven to provide an acceleration to the powder in a upwardly direction;

a second member secured to the hopper;

a shaft rotatable secured to said second member, said first member being pivotably connected to said second member and extending downwardly therefrom, said first member being rotably connected to said shaft; and an eccentric bushing between said shaft and said first member so as to permit said first member to precess about said shaft.

2. An apparatus for assisting the flow of powder from a hopper as claimed in claim 1, wherein said first member comprises a protrusion having a portion thereof extending in a direction perpendicular to the longitudinal axis of said shaft to provide an acceleration to the powder in a upwardly direction.

3. An apparatus for assisting the flow of powder from a hopper, the hopper defining an aperture in the lower portion thereof, the apparatus comprising:

a body defining a body longitudinal axis thereof and rotatably mounted to the hopper;

a shaft defining a shaft longitudinal axis thereof and rotatably mounted at least partially within said body;

a flexible coupling extending from one end of said body; and secured thereto; and a member pivotably secured to and extending downwardly from said flexible coupling, said member operably associated with said flexible coupling and said shaft so as to permit said member to precess about said shaft longitudinal axis.

4. An apparatus for assisting the flow of powder from a hopper as claimed in claim 3; further comprising:

a first rotating means for rotating the shaft at approximately 1000 to 4000 RPM; and a second rotating means for rotating the body at approximately 10 to 45 RPM.

5. An apparatus for assisting the flow of powder from a hopper as claimed in claim 3, further comprising a valve operably connected to said hopper and cooperating therewith so that powder moves from the hopper through the valve as the toner exits the hopper.

6. An apparatus for assisting the flow of powder from a hopper as claimed in claim 5 wherein said valve comprises a magnetic valve.

7. An apparatus for assisting the flow of powder from a hopper containing a supply of powder, comprising:

a first member rotatably and pivotably mounted about an axis with respect to the hopper, said first member including a surface thereof perpendicular to the axis, said surface of said first member providing an acceleration to the powder in a upwardly direction; and a shaft rotatably mounted about the axis, said first member eccentrically mounted to said shaft so that said surface of said first member moves cyclically in a direction along the axis to provide an acceleration to the powder in a upwardly direction.

8. An apparatus for assisting the flow of powder from a hopper as claimed in claim 7, further comprising:

a first rotating means for rotating the shaft at approximately 1000 to 4000 RPM; and a second rotating means for rotating the first member at approximately 5 to 50 RPM.

9. An apparatus for assisting the flow of powder from a hopper containing a supply of powder, comprising:

a shaft, rotatably connected to the hopper about an axis; and a first member rotatably and pivotably mounted with respect to the hopper and eccentrically and rotatably mounted to said shaft so as to permit said first member to precess about said shaft.

10. An apparatus for assisting the flow of powder from a hopper as claimed in claim 9, wherein said first member includes a surface perpendicular to the axis for providing an acceleration to the powder in a upward direction.

11. An apparatus for assisting the flow of powder from a hopper as claimed in claim 10, wherein said surface of said first member accelerates the powder in a upwardly direction opposed to gravity by an amount of approximately 32 to 64 feet per second squared so as into increase the density of the powder so that the density of the powder is increased by at least 10%.

12. An apparatus for assisting the flow of powder from a hopper as claimed in claim 11, wherein the increase in the density of the powder of at least 10% improves the flow of the powder by a factor of approximately 40.

* * * * *